United States Patent [19]

Wilson

[11] 4,033,222

[45] July 5, 1977

[54] MULTIPLE SLEEVE BLIND FASTENER

[75] Inventor: Leslie B. Wilson, Yorba Linda, Calif.

[73] Assignee: Monogram Industries, Inc., Santa Monica, Calif.

[22] Filed: Aug. 12, 1976

[21] Appl. No.: 713,696

Related U.S. Application Data

[63] Continuation-in-part of Ser. No. 606,720, Aug. 21, 1975, abandoned.

[52] U.S. Cl. .................................... 85/72; 85/73
[51] Int. Cl.² ................................ F16B 13/06
[58] Field of Search ............ 85/73, 72, 74, 75, 69, 85/67, 76, 78

[56] References Cited

UNITED STATES PATENTS

| 665,705 | 1/1901 | Summerer | 85/69 |
|---|---|---|---|
| 1,031,462 | 7/1912 | Paine | 85/73 |
| 2,765,699 | 10/1956 | La Torre | 85/72 |
| 2,787,185 | 4/1957 | Rea et al. | 85/73 |
| 3,262,353 | 7/1966 | Waeltz et al. | 85/72 |
| 3,267,793 | 8/1966 | Devine et al. | 85/75 |
| 3,283,640 | 11/1966 | Ono | 85/69 |
| 3,421,404 | 1/1969 | Jacobs | 85/73 |
| 3,643,544 | 2/1972 | Massa | 85/72 |

Primary Examiner—Ramon S. Britts
Attorney, Agent, or Firm—Poms, Smith, Lande & Glenny

[57] ABSTRACT

A multiple sleeve blind fastener has a relatively large bearing surface on the blind side of the material in which the fastener is to be mounted, such as the skin of an aircraft or the like. The fastener includes a nut on the driving side of the mating hole in the skin into which the fastener is to be inserted. The nut is threaded onto a core bolt which extends into the mating hole and terminates in a head on the blind side. A plurality of sleeves are rotatably mounted on the core bolt between the head and the nut, the sleeves being disposed on the blind side when the fastener is inserted into the mating hole. The nut includes a tapered body portion which also extends through the mating hole from the driving side into the blind side thereto. In operation, when the core bolt is tightened, the first sleeve rides onto the tapered body portion of the nut and the successive sleeves ride onto and over the preceding sleeves thereby forming a relatively large bearing surface on the walls surrounding the mating hole, this surface depending upon the total number of sleeves and thicknesses thereof.

11 Claims, 8 Drawing Figures

U.S. Patent    July 5, 1977    Sheet 2 of 2    4,033,222
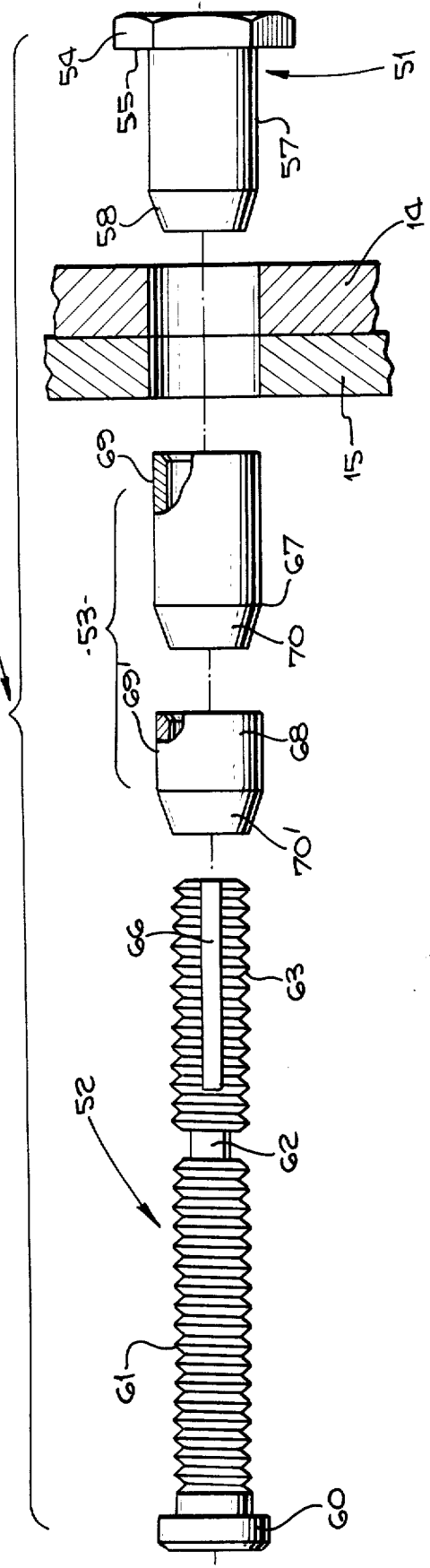
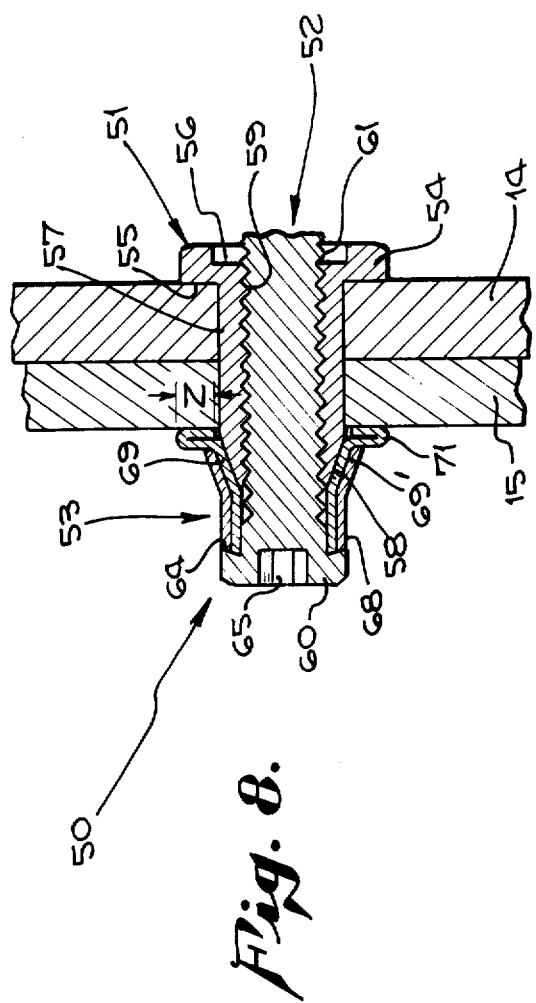

MULTIPLE SLEEVE BLIND FASTENER

CROSS-REFERENCE TO RELATED APPLICATION

This application is a continuation-in-part of application Ser. No. 606,720, filed Aug. 21, 1975, now abandoned.

BACKGROUND OF THE INVENTION

1. Field of the Invention

The invention relates to blind fasteners, and, more particularly, to blind fasteners providing a relatively large bearing surface.

2. Description of the Prior Art

Blind fasteners are known of a type having three-pieces, a nut, a headed core bolt and an expansible sleeve. The core bolt has a threaded shank with a breakneck portion separating the shank from a break-off portion. The nut has a head at one end to provide axial restraint on the driving side of two or more sheets and a tapered nose at its other end which extends beyond the blind side of the sheets. The sleeve is interposed between the nut's nose and the core bolt head. The fastener is set by rotating the core bolt with a driving tool engaged with the breakoff portion while holding the nut in the sheets. The core bolt head is drawn inwardly towards the blind side of the sheets to expand the sleeve over the conical nose of the nut to force the sleeve into compressive contact with the sheets. Upon reaching a predetermined torsional stress, the breakoff or driving portion of the core bolt severs from the shank at the breakneck groove. Axial restraint is provided in the set fastener by the expanded sleeve and the head of the nut. This type of fastener is described in U.S. Pat. No. 2,765,699 to J. LaTorre.

The type of fastener just described is extensively used as a substitute for standard nuts and bolts in aerospace and aircraft applications where high speed and ease in installation are required. The nut employed has a cylindrical intermediate section which is received in the hole in the sheets secured by the fastener. A small clearance is usually provided between the intermediate portion and the hole. The clearance results from the practical inability to provide an interference fit between the cylindrical intermediate portion and its mating hole.

Such sheets may be made of many suitable materials. One of these materials used on aircrafts is a graphite composite which is relatively soft and might be crushed or permanently deformed by such prior art fasteners. That is, most blind fasteners do not provide a large enough bearing surface on the blind side.

Certain sized apertures or mating holes are generally specified by aircraft companies and thus certain diameter blind fasteners are designated. The aforementioned prior art blind fasteners that would normally be used in such pre-designated mating holes do not provide a sufficient bearing surface on the blind side.

In U.S. Pat. No. 2,787,185 to Rea, an expansion fastener having a sealing liner is disclosed. Rea thus shows a pair of sleeves 36 and 38, sleeve 36 being a sealant liner and unable to support a load. The material of sleeve 36 of Rea et al may be nylon, not an outwardly expansible ductile material capable of stretching without splitting but able to support a load when expanded. The purpose of the sealant liner of Rea is to extrude into any clearance area of the fastening system which might result in a "leak path" which would be unacceptable in a fluid-tight system. For this reason, it is not necessary that the inner diameter of sleeve 38 be of any particular configuration or of an outwardly expansible ductile metallic material. Further, sleeve 38 of Rea et al is an easily deformed or molded material and sleeve 36 is a sealant. This is because the entire purpose of Rea et al is to provide only a fluid-tight fastener, not one also capable of supporting a load.

There is thus a need for a blind fastener which can be inserted in a designated size mating hole in a material, such as graphite composite, which will provide a sufficiently large bearing surface.

SUMMARY OF THE INVENTION

It is an object of this invention to provide a blind fastener which can be used in a designated mating hole in an aircraft skin or the like and provide a suitable bearing surface on the blind side without permanent deformation of the skin regardless of the material of the aircraft skin or the like.

It is a further object of this invention to provide a blind fastener which is particularly suited for use in mating holes in relatively soft materials, such as graphite composite.

It is still another object of this invention to provide a blind fastener which has increased tensile strength, mass, and bearing surface for all applications.

These and other objects are accomplished by providing a multiple sleeve blind fastener having a relatively large bearing surface on the blind side of the material in which the fastener is to be mounted, such as the skin of an aircraft or the like. The fastener includes a nut on the driving side of the mating hole into which the fastener is to be inserted. The nut is threaded onto a core bolt which extends into the mating hole and terminates in a head on the blind side. A plurality of sleeves are rotatably mounted on the core bolt between the head and the nut, the sleeve being disposed on the blind side when the fastener is inserted into the mating hole. The nut includes a tapered body portion which also extends through the mating hole from the driving side into the blind side thereto. In operation, when the core bolt is tightened, the first sleeve rides onto the tapered body portion of the nut and the successive sleeves ride onto and over the proceding sleeves thereby forming a relatively large bearing surface on the walls surrounding the mating hole, this surface depending upon the total number of sleeves and thicknesses thereof.

BRIEF DESCRIPTION OF THE DRAWING

FIG. 2 is a vertical, cross-sectional view of the assembled fastener of FIG. 1 prior to setting the fastener into a mating hole in the skin of an aircraft or the like;

FIG. 3 is a vertical view, partly in section, showing the fastener of FIGS. 1 and 2 installed in a mating hole of the skin of an aircraft or the like;

FIG. 7 is an exploded view of another embodiment of the invention; and

FIG. 8 is a vertical, cross-sectional view of the assembled condition of the embodiment of the fastener of FIG. 7.

DESCRIPTION OF THE PREFERRED EMBODIMENTS

Figure 1:
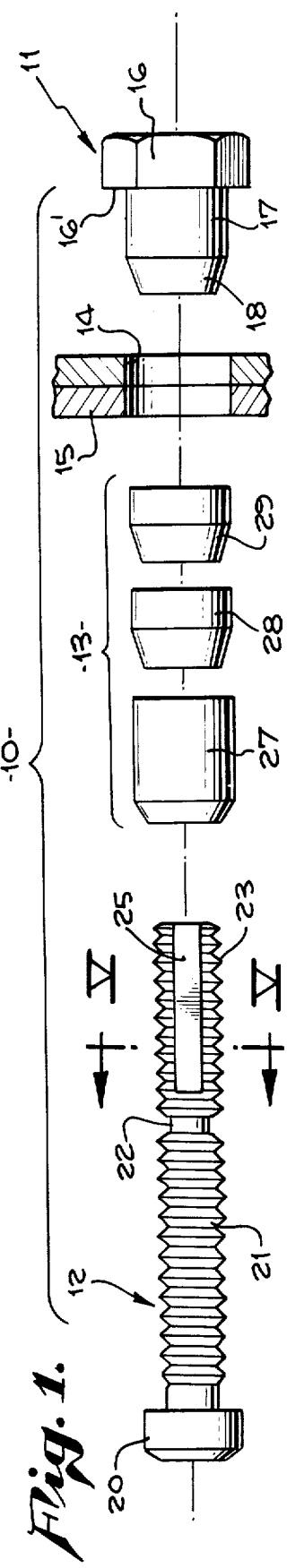
FIG. 1 is an exploded view of a multiple sleeve blind fastener in accordance with the teachings of this invention.
Figure 3:
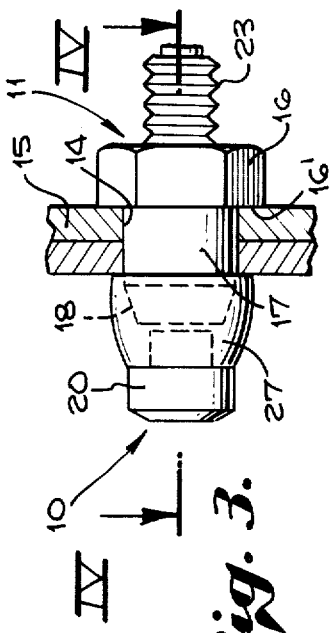
Figure 2:
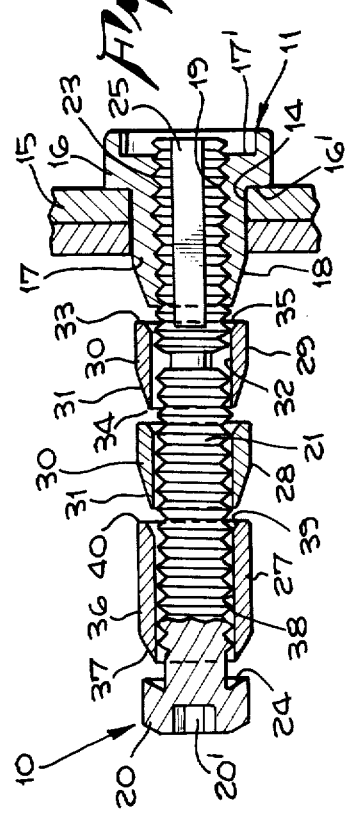

Referring now to FIG. 1 of the drawing, a multiple sleeve blind fastener 10 in accordance with the teachings of my invention is disclosed. In general, fastener 10 comprises a nut 11, a core bolt 12 and a plurality of expansible sleeves which, as will be described, form bearing surface means 13 in accordance with my invention. When assembled, as shown in FIG. 2 and as will be discussed hereinbelow with respect to FIGS. 3 and 4, the fastener 10 will be inserted into a mating hole 14 of the skin 15 of an aircraft or the like. such skins 15 may be comprised of a single layer or have more than one layer as shown in FIG. 1. Also, as discussed hereinabove, such holes may be predrilled or otherwise previously formed in skin 15 so that the fastener must fit the hole 14, and not vice-versa. Finally, although the techniques of my invention are suited to skins or walls of any suitable material, the invention is particularly applicable to skins or the like of a relatively soft material, such as graphite composite.

Thus, referring again to FIG. 1, nut 11 includes a head 16 having an abutting shoulder 16' which adapts nut 11 for mounting in hole 14 as will be described. A recess 17' may be provided in head 16, as shown in FIG. 2, to assist in driving nut 11 by use of a conventional driving tool (not shown) as will hereinafter be explained. A generally cylindrically-shaped intermediate portion 17 extends from head 16 and terminates in a generally-conically shaped nose portion 18. Nut 11 has an axially threaded bore 19 extending throughout its entire length (see FIG. 4).

Figure 5:
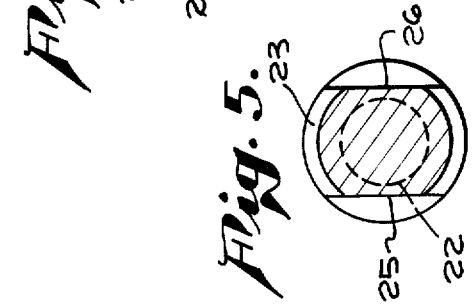
FIG. 5 is a cross-sectional view of the fastener of FIG. 1 taken along the lines V—V thereof.

Core bolt 12 includes a head 20, a threaded shank portion 21, a smooth breakneck portion or groove 22 and a threaded breakoff portion 23. The threads in both shank portion 21 and break-off portion 23 are adapted for engagement in the threads of axial bore 19 of nut 11. Head 20 may or may not have an interior, annular groove or recess 24 for receiving thereagainst one end of the first of the sleeves forming the bearing surface means 13, as will hereinafter be described, to expand it over the preceding sleeves, the last sleeve (that is, the terminal sleeve adjacent nut 11) expanding over the nose portion 18 of nut 11. Head 20 may also have a slotted portion, as a cross-shaped slot 20', for receiving a screwdriver (not shown) therein. Break-off portion 23 includes a pair of complementary wrenching flats 25, 26 (see FIG. 5) for the driving tool (not shown). Break-off groove 22 is provided in order that break-off portion 23 may be separated from the remainder of core bolt 12 upon the application of a predetermined torsional stress.

The foregoing has described a conventional blind fastener with the exception of the groove 24 and the plurality of sleeves forming the bearing surface means. That is, prior art fasteners have only a single sleeve, which is generally cylindrical with internal chamfered ends, which is engaged by shoulder 24 to expand it over nose portion 18 of nut 11.

Thus, as particularly contemplated by my invention bearing surface means are provided for providing a relatively large bearing surface on the skin 15 surrounding mating hole 14. In the exemplary embodiment of the invention, such bearing surface means 13, in addition to aforementioned groove 24, includes a plurality of expansible sleeves, sleeves 27 through 29 being disclosed, for carrying out the invention.

Sleeves 28 and 29 may or may not be identical and one or more may be used to carry out the invention. Referring more particularly to FIG. 2, sleeves 28, 29 each have a main, generally cylindrical portion 30 and a tapered or generally conical portion 31. Each sleeve 28, 29 includes a relatively smooth internal bore 32 of a diameter slightly greater than the diameter of shank portion 21 and break-off portion 23 to easily slide thereon. It can be seen in FIG. 2 that the end 33 of each sleeve 28, 29 is slightly greater in thickness than the end 34. Finally, each sleeve 28, 29 may or may not be chamfered, as at chamfer 35, internally at end 33 to facilitate the setting of the respective sleeve.

Referring now to sleeve 27, sleeve 27 is greater in overall length than sleeves 28, 29 (which are preferably the same length, but need not be so). In this embodiment of the invention, the overall length of sleeve 27 is selected so that it will enclose successive sleeves 28, 29 when assembled as will be discussed. Thus, sleeve 27 may be slightly lesser in overall length if only a single successive sleeve 28, 29 were used (but slightly greater than the single sleeve 28, 29).

Thus, sleeve 27 includes a relatively long main body portion 36 terminating at the end adjacent head 20 in a short tapered portion 37. Sleeve 27 also has a relatively smooth internal bore 38 of a diameter slightly greater than the diameter of shank portion 21 and break-off portion 23 to easily slide thereon. Finally, sleeve 27 may or may not be internally chamfered, as at chamfer 39, at the end 40 thereof adjacent sleeves 28, 29. As shown in FIG. 2, the chamfers 39, 35 are related to the thickness of ends 34 of sleeves 28, 29 as will be discussed.

The use of fastener 10 in conjunction with its assembly and insertion into mating hole 14 of the skin 15 of an aircraft or the like will now be described. FIG. 2 shows the fastener 10 in its assembled condition. The fastener 10 is assembled by threading core bolt 12 in the threads 19 of nut 11 with sleeves 27 through 29, arrayed as shown in FIGS. 1 and 2, disposed on bolt 12 between head 20 and nose portion 18. The assembled fastener 10 is then inserted through the mating hole 14 from the driving side to the blind side of skin 15. Hole 14 is at least slightly greater in diameter than nose 18. After fastener 10 is inserted into hole 14 and shoulder 16' abuts against the wall portions of skin 15 surrounding hole 14, as shown in FIG. 2, a driving tool (not shown) is used to engage the threads of break-off portion 23 and wrenching recess 17' of nut 11. Nut 11 is constrained by the driving tool against axial displacement outwardly of skin 15 and against rotation. Continued rotation of core bolt 12 draws the head 20 of bolt 12 inwardly towards the blind side of skin 15 to engage the first expansible sleeve 27 while the sleeve 29 engages the nose portion 18 (simultaneously, sleeve 28 is engaged by sleeve 27 and in turn engages sleeve 29).

The unique features of the bearing surface means 13 may best be appreciated by referring to FIG. 2. Sleeve 29 is about to ride over and onto tapered nose portion 18. The sleeve 28 is about to ride over end 34 of sleeve 29. Sleeve 27 is about to ride over end 34 of sleeve 28. Finally, the end of tapered portion 37 of sleeve 27 is about to enter recess 24 of head 20.

Thus, as bolt 12 is rotated, sleeve 29 is driven over nose portion 18 until it engages the blind side of skin 15 with a relatively high compression force. Sleeve 28 is driven over sleeve 29 with similar force. Sleeve 27 is driven over sleeve 28 with similar force. The compressive force is provided, as is the driving force, by core bolt head 20 through the core-bolt 12 from the driving tool. The tapered end or portion 37 of sleeve 27 enters recess 24. Sleeves 27 through 29 exert a considerable clamping force on the smooth portion 22 of shank 21 as well as the conical surface of nose portion 18. This is the position shown in FIG. 3. When a predetermined torsional stress is reached in the core bolt 12, break-off portion 23 separates from the remainder of core bolt 21 by failure thereof at groove 22. After separation, the set fastener 10 looks as it does in FIG. 4.

Figure 4:
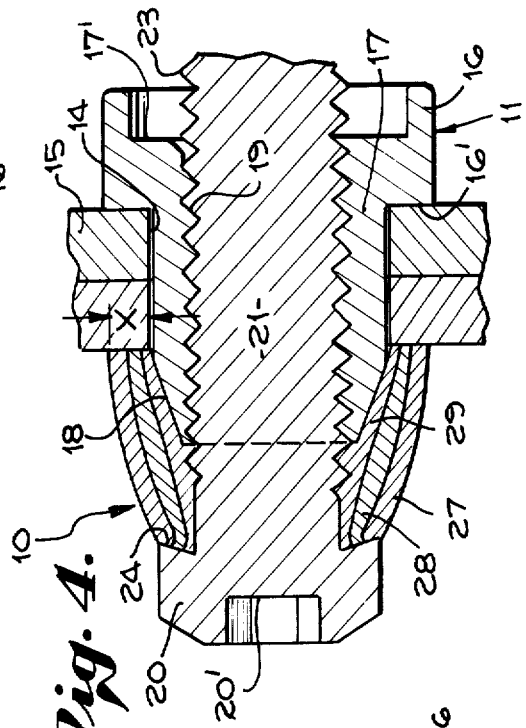
FIG. 4 is a cross-sectional view, taken along the lines IV—IV of FIG. 3 of the fastener of FIG. 1 through 3.

Thus, as shown in FIG. 4, sleeve 29 is compressed between nose portion 18 and the portion of shank 21 adjacent head 30 and the internal wall 32 of second adjacent sleeves 28. Sleeve 28 is in turn compressed between the internal wall 38 of third sleeve 27 and the outer wall of portions 30, 31 of first sleeve 29. Sleeve 27 is compressed onto the outer wall of portions 30, 31 of second sleeve 28 and within recess 24. All of the sleeves abut against the blind side of skin 15 surrounding hole 14. Ends 33 of sleeves 28, 29 and end 40 of sleeve 27 thus are compressed to a thickness X (FIG. 4) forming a relatively large bearing surface on skin 15 with little permanent deformation to skin 15.

Figure 6:
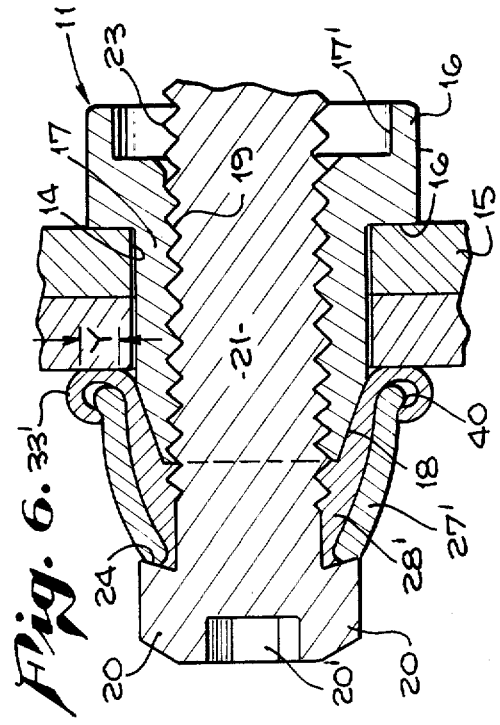
FIG. 6 is a cross-sectional view, similar to that of FIG. 4, showing an alternate embodiment of the fastener of FIGS. 1 through 5.

The foregoing has described a first embodiment of the invention wherein three sleeves are used. As discussed previously, one of the sleeves 28, 29 may be eliminated and the end result would be similar to FIG. 4 except that the thickness X would be lesser (assuming the length of sleeve 27 was related to the length of the single sleeve 28 or 29). However, as shown in FIG. 6 wherein like numerals refer to like parts of FIGS. 1 through 5, the interior sleeve may even be longer than the outer sleeve to provide an even greater bearing surface. Thus, sleeve 28' is similar to sleeve 28 and sleeve 27' is similar to sleeve 27 excepting that sleeve 28' may be greater in overall length than sleeve 27'. When compressed as discussed hereinabove, sleeve 28' bends at the blind side of skin 15 and curves around to form curved end 33' which encircles and encloses end 40 of sleeve 27'. This provides a bearing surface Y which is substantially greater than bearing surface X.

The set fasteners of FIGS. 1 through 6 exhibit considerable bearing and fatigue resistance by virtue of the considerably large bearing surfaces X and Y. This insures a continuous area of contact between the fastener and the skin 15 in which it is mounted. The result is that there is more area available to resist bearing forces and restrict permanent deformation of skin 15.

Although head 20 has been disclosed as slotted, it need not be so, slot 20' being only necessary for assembly and having no useful function otherwise. The sleeves 27 through 29 (and sleeves 27' and 28' are made of a suitable expansible material, such as stainless steel or nickel-base alloys. They may also be made of titanium alloy or any suitable material that stretches without splitting but supports a load when expanded.

Further, although three sleeves have been disclosed in the FIGS. 1 through 5 embodiments, obviously any number may be used depending on the lengths selected. That is, the outer sleeve in the embodiment of FIGS. 1 through 5 (sleeve 27) must be long enough to enclose or absorb the inner sleeves. The inner sleeves could, of course, all be of the same length. Preferred materials for the remaining portions of the fasteners disclosed herein are well known in the art and adequately disclosed in a commonly assigned U.S. Pat. No. 3,643,544 to Massa.

In addition, in both embodiments, sleeves of differing ductility may be used. This renders the invention more practical and versatile than prior art fasteners permitting better quality control and a more reliable product. Further, the sleeves of this invention may be of a single material. This is important since various techniques have been tried in the past to provide a larger bearing surface using a single sleeve having a relatively hard portion and a relatively soft portion of differing metals which bends and is compressed against the blind side. Also, it has been suggested to soften a given area of a single sleeve of relatively hard material to fold or bend it against the blind side. Both suggestions are difficult and expensive and require elaborate manufacturing techniques.

In FIGS. 7 and 8, another embodiment of a multiple sleeve blind fastener in accordance with the teachings of my invention is shown. Thus, fastener 50 comprises a nut 51, a core bolt 52 and a pair of expansible sleeves which form bearing surface means 53 in accordance with my invention. When assembled, as shown in FIG. 8, the fastener 50 will be inserted into a mating hole 14 of the skin 15 of an aircraft or the like as heretofore disclosed.

As also discussed hereinabove with respect to the fasteners of FIGS. 1 through 6, nut 51 includes a head 54 abutting shoulder 55, a recess 56 (FIG. 8), a generally cylindrical intermediate portion 57, a generally conically-shaped nose portion 58 and an axially threaded bore 59, all similar to the nut 11 of the FIG. 1 embodiment.

Core bolt 52 may also include a head 60, a threaded shank portion 61, a break-neck portion 62, a threaded break-off portion 63, an annular groove or recess 64, a slotted portion 65, and wrenching flats 66 all similar to like components of core bolt 12 of the FIG. 1 embodiment.

As particularly contemplated in the present invention, bearing surface means 53 are provided for providing a relatively large bearing surface on the skin 15 surrounding mating hole 14. Although this embodiment is similar to the foregoing embodiments, particularly the embodiment of FIG. 6, it has the advantage of providing a larger blind side bearing surface than the FIG. 6 embodiment.

Thus, in the exemplary embodiment of the invention, such bearing surface means 53, in addition to the aforementioned optional groove 64, includes a pair of expansible sleeves 67, 68, sleeve 67 being hereafter referred to as the inner sleeve and sleeve 68 as the outer sleeve. As discussed hereabove with respect to sleeves 28, 29, each sleeve 67, 68 may have a main generally cylindrical body portion 69, 69' respectively, and a tapered or generally conical portion 70, 70' respectively. Each sleeve 67, 68 may also have a relatively smooth internal bore of a diameter slightly greater than the diameter of portions 61, 63 of bolt 52 and otherwise configured as aforementioned sleeves 28, 29 (optionally including chamfers, similar to chamfers 35, and thicker ends, similar to ends 33 of sleeves 28, 29). As will be discussed, sleeve 67 may be slightly longer in overall length than sleeve 68, as for example, between about 10% to 90% longer.

Both sleeves 67, 68 are made of ductile material, such as the materials discussed hereinabove. However, the inner sleeve 67 is more ductile and of a lower yield strength than outer sleeve 68 (i.e., either of the same material but more ductile or of differing materials, sleeve 67 having more ductility).

The use of fastener 50 is identical to the use of the fasteners previously described. Fastener 50 is thus assembled by threading core bolt 52 in the threads of nut 51 with sleeves 67, 68, arrayed as shown in FIG. 7, disposed on bolt 52 between head 60 and nose portion 58. The assembled fastener is then inserted through mating hole 14 from the driving side to the blind side of skin 15. As previously discussed, when portion 63 and recess 56 is engaged by a driving tool and bolt 52 is rotated, head 60 of bolt 52 is drawn inwardly toward the blind side of skin 15 to engage the first expansible sleeve 68 while the sleeve 67 engages the nose portion 58.

The arrangement of the various components of fastener 50 prior to final assembly is identical to that shown in FIG. 2 save for the absence of sleeve 27. Thus, as bolt 52 is rotated, sleeve 67 is driven over nose portion 58 until it engages the blind side of skin 15 with a relatively high compression force. Sleeve 68 is driven over sleeve 67 with similar force. The tapered ends 70, 70' of both sleeves 67, 68 enter recess 64 (FIG. 8). After break-off, as previously discussed, the fastener 50 is as shown in FIG. 8. It can be seen that when inner sleeve 67 is compressed, its greater length than sleeve 68 allows it to bend about itself against the blind side of skin 15 and curve back on itself to form curved end 71. Sleeve 68 overlies sleeve 67 between its curved end 71 and the end of sleeve 67 in recess 64. At recess 64, the tapered end 70 of sleeve 68 overlies and encompasses tapered end 70 of sleeve 67. As can be seen by comparing FIGS. 4, 6 and 8, the bearing surface Z of fastener 50 is substantially greater than the previously discussed bearing surfaces.

It can be seen that in all the foregoing embodiments, the ductile sleeves expand outwardly to increase the area of the blind side bearing surface, rather than extruding in, to fill leak paths in the assembly. These fasteners are particularly suitable for use in advanced composite aircraft structural material, which latter requires a fastener having a large bearing surface. Known prior art devices which seal do not provide such bearing surfaces.

By making the inner sleeve 67 more ductile and of a lower yield strength than the outer sleeve 68 in the embodiments of FIGS. 7 and 8, an even larger blind side bearing surface is obtained. Present day composite structural aircraft material is very sensitive to compressive loads put on it by the sleeves of such fasteners. The larger surface area of the FIGS. 7 and 8 embodiment is formed at a lower pounds per square inch compressive stress on the fastened material, thus resulting in less damage to the fastened material. Having the outer sleeve 68 less ductile than the inner sleeve provides the column strength necessary to deliver the tensile strength required of the entire fastener assembly.

Prior to fastening, the inner sleeve 67 has a yield strength compatible with the compressive strength of the material to which fastener 50 is secured (e.q., skin 15). That is, its yield strength may be equal to or lower than the compressive strength of skin 15 or other material to which it is fastened. The outer sleeve 68 may have a yield strength greater than inner sleeve 67 and may also be greater than the material in which fastener 50 is mounted. Although any suitable material may be used, as heretofore discussed, preferably sleeves 67 and 68 are made from nickel-base alloys. Alternatively, sleeve 68 may be of stainless steel and sleeve 67 made from a nickel base alloy.

The latter comments of course apply to all the embodiments, the difference in each residing mainly in the differing bearing surfaces and strength of the final assembly.

I claim:

1. In a blind fastener system having a skin with reduced permanent deformation, said skin having a driving side and a blind side and a hole extending through the skin, a blind fastener having a nut with an internally threaded axial bore throughout with a generally conically shaped nose portion at one end and a head of larger diameter than said hole and an intermediate generally cylindrical portion between the nose portion and the head, at the other end, the nut being within the hole in the skin with the nose portion extending beyond the blind side, the head being on the driving side and abutting thereagainst, the intermediate portion extending into the hole and being substantially the same overall length as the depth of said hole, the head exerting an axial compressive force on the hole, a core bolt having a head and a threaded shank portion, the core bolt head extending outwardly from the nose portion of the nut and the threaded shank portion being threaded in the axial bore of the nut, and bearing surface means rotatably mounted on said threaded shank portion, said bearing surface means being in compressive engagement with the blind side of said skin and the head of the core bolt, said conical nose portion receiving said bearing surface means thereon and said bearing surface means exerting a direct compressive force on the conical nose portion only exteriorly of said skin, the improvement which comprises:

said bearing surface means includes at least a pair of expansible sleeves, each of said sleeves being comprised of an outwardly expansible ductile material and having substantially the same outer diameter and having a first end, a second end and a main body portion interconnecting said first and second ends and an internal bore of substantially uniform diameter throughout, said core bolt head having core bolt head means for retaining said second ends thereagainst, and each of said sleeves having their first ends in compressive engagement only with the blind side of said skin and their second ends being compressed between the core bolt head means and said blind side, and the internal bore of one of said sleeves receiving the conical nose portion and exerting a direct compressive force on the conical nose portion only exteriorly of said skin, and the other of said sleeves receiving and substantially enclosing said one of said sleeves and being of a less ductile material than the other of said sleeves with the other of said sleeves exerting a direct compressive force on said one of said sleeves only exteriorly of said skin, the compressive engagement of the first ends of said sleeves on the blind side of said skin acting toward the driving side of said skin, said one of said sleeves being greater in overall length than the overall length of said other of said sleeves and having its first end extending generally parallel to said blind side and folded about itself thereby presenting a doubled up first end of said one of said sleeves bearing directly against said blind side, the first end of said other of said sleeves bearing against the side of the doubled-up first end of said one of said sleeves remote from said blind side at substantially the junction of the first end of said one of said sleeves with its main body portion, said doubled-up portion forming a bearing surface bearing against the blind side of said skin.

2. In the system of claim 1 wherein each of said sleeves are comprised of a single piece of metallic material.

3. In the system of claim 1 wherein a pair of sleeves are provided, including an inner sleeve and an outer sleeve, said outer sleeve being of stainless steel and said inner sleeve being of nickel-base alloy.

4. In the system of claim 1 wherein a pair of sleeves are provided including an inner sleeve and an outer sleeve, both of said sleeves being of nickel-base alloy.

5. In the system of claim 1 wherein a pair of sleeves are provided including an inner sleeve and an outer sleeve, said inner sleeve being and of a lower yield strength than said outer sleeve, the yield strength of said inner sleeve being compatible with the compressive strength of said skin.

6. In the system of claim 5 wherein said core bolt head has an annular groove receiving one end of each of said sleeves therein.

7. In a blind fastener system having a skin with reduced permanent deformation, said skin having a driving side and a blind side and a hole extending through the skin, a blind fastener having a nut with an internally threaded axial bore throughout with a generally conically shaped nose portion at one end and a head of larger diameter than said hole and an intermediate generally cylindrical portion between the nose portion and the head, at the other end, the nut being within the hole in the skin with the nose portion extending beyond the blind side, the head being on the driving side and abutting thereagainst, the intermediate portion extending into the hole and being substantially the same overall length as the depth of said hole, the head exerting an axial compressive force on the hole, a core bolt having a head and a threaded shank portion, the core bolt head extending outwardly from the nose portion of the nut and the threaded shank portion being threaded in the axial bore of the nut, and bearing surface means rotatably mounted on said threaded shank portion, said bearing surface means being in compressive engagement with the blind side of said skin and the head of the core bolt, said conical nose portion receiving said bearing surface means thereon and said bearing surface means exerting a direct compressive force on the conical nose portion only exteriorly of said skin, the improvement which comprises:

said bearing surface means includes a pair of expansible sleeves, each of said sleeves having substantially the same outer diameter and having a first end, a second end and an internal bore, said core bolt head having core bolt head means for retaining said second ends thereagainst, and each of said sleeves having their first ends in compressive engagement only with the blind side of said skin and their second ends being compressed between the core bolt head means and said blind side, and the internal bore of one of said sleeves receiving the conical nose portion and exerting a direct compressive force on the conical nose portion only exteriorly of said skin, and the other of said sleeves receiving and substantially enclosing said one of said sleeves with the other of said sleeves exerting a direct compressive force on said one of said sleeves only exteriorly of said skin, the compressive engagement of the first ends of said sleeves on the blind side of said skin acting toward the driving side of said skin, and a third expansible sleeve, said third sleeve having substantially the same outer diameter as said first and second sleeves and having a first end in compressive engagement only with the blind side of said skin and a second end compressed between the core bolt head means and said blind side, and an internal bore receiving therein said other of said sleeves and exerting a direct compressive force on said first and second sleeves and substantially enclosing said first and second sleeves.

8. In a blind fastener system having a skin with reduced permanent deformation, said skin having a driving side and a blind side and a hole extending through the skin, a blind fastener having a nut with an internally threaded axial bore throughout with a generally conically shaped nose portion at one end and a head of larger diameter than said hole and an intermediate generally cylindrical portion between the nose portion and the head, at the other end, the nut being within the hole in the skin with the nose portion extending beyond the blind side, the head being on the driving side and abutting thereagainst, the intermediate portion extending into the hole and being substantially the same overall length as the depth of said hole, the head exerting an axial compressive force on the hole, a core bolt having a head and a threaded shank portion, the core bolt head extending outwardly from the nose portion of the nut and the threaded shank portion being threaded in the axial bore of the nut, and bearing surface means rotatably mounted on said threaded shank portion, said bearing surface means being in compressive engagement with the blind side of said skin and the head of the core bolt, said conical nose portion receiving said bearing surface means thereon and said bearing surface means exerting a direct compressive force on the conical nose portion only exteriorly of said skin, the improvement which comprises:

said bearing surface means includes a plurality of expansible sleeves, each of said sleeves having substantially the same outer diameter and having a first end, a second end and an internal bore, said core bolt head having core bolt head means for retaining said second ends thereagainst, and each of said sleeves having their first ends in compressive engagement only with the blind side of said skin and their second ends being compressed between the core bolt head means and said blind side, and the internal bore of one of said sleeves receiving the conical nose portion and exerting a direct compressive force on the conical nose portion only exteriorly of said skin, and the other of said sleeves receiving and substantially enclosing said one of said sleeves with the other of said sleeves exerting a direct compressive force on said one of said sleeves only exteriorly of said skin, the compressive engagement of the first ends of said sleeves on the blind side of said skin acting toward the driving side of said skin, the first end of said one of said sleeves having a curved end curving at said skin and about said first end of said other of said sleeves, said curved end enclosing said first end of said other of said sleeves and being in compressive engagement only with the blind side of said skin.

9. In the blind fastener of claim 5 wherein said core bolt head means includes an annular recess in said core bolt head on the side thereof facing said threaded shaft portion.

10. In the blind fastener of claim 5 wherein all of said sleeves are comprised of a single piece of metallic material.

11. In a blind fastener having a nut with an internally threaded axial bore throughout with a generally conically shaped nose portion at one end and a head of larger diameter than said nose portion at the other end, and an intermediate generally cylindrical portion of lesser diameter than said head between the nose portion and the head, a core bolt having a head and a threaded shank portion, the threaded shank portion including a main shank portion and break-off portion having wrenching flats thereon separated by a relatively smooth groove, said main shank portion being at least as long as said nut, the threaded shank portion being threaded in the axial bore of the nut, the improvement which comprises:

at least a pair of expansible sleeves, said sleeves each having a generally cylindrical main body portion and a generally conically shaped portion and a relatively smooth internal bore slightly greater in diameter than the outer diameter of said shank portion, said sleeves being rotatably mounted on said threaded shank portion between said core bolt head and said nut, one of said sleeves being disposed adjacent said core bolt head and the other sleeve being disposed adjacent said nut, each of said sleeves being substantially the same outer diameter, each of said sleeves having a first end at said cylindrical portion and a second end at said conically shaped portion, and;

core bolt head means associated with said core bolt head for receiving the second end of the sleeve adjacent said core bolt head thereagainst, said sleeves being substantially the same overall length and a third expansible sleeve being provided, said third sleeve having a generally cylindrical main body portion and a generally conically shaped portion and a relatively smooth internal bore slightly greater in diameter than the outer diameter of said shank portion, said third sleeve being rotatably mounted on said shank portion between said one of said sleeves and said core bolt head, said third sleeve being substantially the same outer diameter as said pair of sleeves and slightly greater in overall length than said pair of sleeves, said third sleeve having a first end at said cylindrical portion adjacent the second end of said one of said sleeves and a second end at said conically shaped portion adjacent said core bolt head.

* * * * *